United States Patent
Duncan et al.

(10) Patent No.: US 7,555,609 B2
(45) Date of Patent: Jun. 30, 2009

(54) SYSTEMS AND METHOD FOR IMPROVED DATA RETRIEVAL FROM MEMORY ON BEHALF OF BUS MASTERS

(75) Inventors: Richard Duncan, Bedford, TX (US); William V. Miller, Arlington, TX (US); Daniel Davis, Arlington, TX (US)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 378 days.

(21) Appl. No.: 11/553,586

(22) Filed: Oct. 27, 2006

(65) Prior Publication Data

US 2008/0104327 A1    May 1, 2008

(51) Int. Cl.
*G06F 12/00* (2006.01)
(52) U.S. Cl. .................. 711/137; 711/155; 711/213
(58) Field of Classification Search ........... None
See application file for complete search history.

(56) References Cited

U.S. PATENT DOCUMENTS 6,970,978 B1 * 11/2005 Wu .......................... 711/137
7,149,850 B2 * 12/2006 Minami ................... 711/137

* cited by examiner

*Primary Examiner*—Jack A Lane
(74) *Attorney, Agent, or Firm*—Thomas, Kayden, Horstemeyer & Risley (57) ABSTRACT

Systems and methods are disclosed herein for retrieving data from memory in a computer system. In one example, a memory controller is coupled to a system bus in a computer system that includes bus masters similarly coupled to the system bus. The memory controller is configured to receive requests to read or write data from memory from bus masters of the computer system. If the memory controller receives an initial request from certain bus masters, the memory controller is further configured to anticipate a future request from certain bus masters and prefetch data on behalf of certain bus masters for rapid delivery following a subsequent request to read data from memory submitted by the certain bus masters.

21 Claims, 6 Drawing Sheets

SYSTEMS AND METHOD FOR IMPROVED DATA RETRIEVAL FROM MEMORY ON BEHALF OF BUS MASTERS

TECHNICAL FIELD

The present invention is generally related to computer hardware, and, more particularly, is related to a system and method for more efficiently retrieving data from memory on behalf of certain bus masters in a computer system.

BACKGROUND OF THE INVENTION

Memory controllers are designed to interface with memory in a computer system on behalf of one or more bus masters (e.g. processors, peripheral devices, video controllers, etc.). Bus masters are components of a computer system which perform various tasks within a computer system and communicate with other components of a computer system, including other bus masters, via a common system bus. A computer system in this context, as in known in the art, can be a system on chip (SoC), a desktop computer, portable computing device such as a personal digital assistant or other forms known in the art. Bus masters often require access to memory in a computer system for the reading and writing of data to perform their prescribed functions in response to a user, operating system, other software or hardware. The accessing of memory is generally handled by a memory controller, which performs the reading of data by retrieving data specified by a request submitted by a bus master and makes it available on the system bus for access by the requesting bus master. A memory controller performs the writing of data to memory by receiving a request to write to memory from a bus master and stores the data in computer system memory.

In some scenarios, a bus master may make requests to read or write data from memory that can be anticipated. For example, an LCD or video controller, when performing the task of updating or drawing the contents of an LCD or video display, typically submits a series of consecutive requests to read data from a range of sequential addresses in memory. Generally, an LCD controller submits these requests to a memory controller, which when the request is received fetches the data from the address specified in the request and delivers it to the LCD controller via the system bus of the computer system. Often, when an LCD controller submits an initial request to read from memory, the next request submitted to the memory controller can be predicted because it will likely submit a request to read data from the next sequential address in memory. Memory controllers as known in the art, however, generally do not have the ability to predict a bus master's subsequent requests to access memory. Therefore, after submitting each request to read from memory, an LCD controller must wait for a memory controller to decode its request, fetch the requested data from memory and make the requested data available on the system bus.

In the abovementioned scenario, the efficiency and performance of a computer system could be improved if the amount of time an LCD controller is forced to wait after submitting a request to read from memory until data is delivered by the memory controller is reduced. Typically, a memory controller, upon receipt of a request to read from memory from a bus master, will respond with a "wait" or a "split" signal, which causes the requesting bus master to wait, and often stall, until the requested data has been delivered. After sending a "wait" signal, the memory controller will then fetch the requested data from memory, which is known in the art as a process that can cause delay in the performance of the computer system. After fetching the data from memory, the memory controller will make the data available on the system bus for the requesting bus master.

Because after submitting a request to read data from memory a bus master must wait for the memory controller to fetch the requested data before receiving it, this is a cause of delay that lowers the performance and efficiency of the computer system. However, if a memory controller has the ability to predict or anticipate subsequent requests from a bus master after receiving an initial request from the bus master, the performance and efficiency of the computer system can be improved. Thus, a heretofore unaddressed need exists in the industry to address the aforementioned deficiencies and inadequacies.

SUMMARY OF THE INVENTION

Embodiments of the present invention provide systems and methods for data from memory in a computer system. Briefly described, in architecture, one embodiment of the system, among others, can be implemented as follows. The system to fetch data from memory includes a system bus and at least one bus master coupled to the system bus. The system further includes a memory controller coupled to the system bus and memory. The memory controller is configured to fetch and store data from memory in response to a request submitted by the at least one bus master. The memory controller is further configured to determine whether to prefetch data from memory on behalf of the at least one bus master and to prefetch and store data for delivery in response to a subsequent request for data from the at least one bus master.

The present disclosure can also be viewed as providing methods for retrieving data from memory in a computer system. In this regard, one embodiment of such a method, among others, can be broadly summarized by the following steps: receiving a request from a bus master to fetch data from memory, determining whether to prefetch data from memory on behalf of the bus master, prefetching data in anticipation of a subsequent request by the bus master in response to the determining step, and storing at least one block of prefetched data for rapid delivery upon the subsequent request by the bus master.

The present disclosure can also be viewed as providing a memory controller for retrieving data from memory. In this regards, one embodiment of such a method, among others, can be broadly implemented as the follow. The memory controller comprises a memory request decoder, a prefetch analyzer, and a prefetch queue. The memory request is decoder configured to decode a request, to read from or write to memory, submitted by a bus master and to determine the identity of the bus master submitting the request. The prefetch analyzer is configured to determine whether to prefetch data from memory on behalf of the bus master submitting the request, and further configured to determine the location in memory to prefetch. Moreover, the prefetch queue configured to store at least one block of data prefetched from memory.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present disclosure generally relates to computer systems having improved memory retrieval capabilities. In accordance with one embodiment a memory controller maintains prefetch control data that enables it to determine whether to prefetch data from memory on behalf of a requesting bus master. In this context, prefetching can be defined as and is known in the art as fetching data from memory, or at least beginning the fetching of data from memory, on behalf of a requesting bus master prior to the bus master submitting a request for the data. The memory controller may determine the identity of a bus master submitting a request to read from memory and determine whether the requesting bus master is likely to submit subsequent requests to read data from memory in a manner that can be anticipated. A non-limiting example of a bus master that may submit requests in a manner that can be anticipated is an LCD (Liquid Crystal Display) or a video controller, which often requests data from sequential addresses in memory in order to retrieve the data necessary to update or draw an LCD screen.

In one embodiment, if the memory controller receives an initial request to read from memory from such a bus master, the memory controller prefetches data residing at the next sequential address from memory for rapid delivery in response to a subsequent request from the bus master, which is likely to be a request to read from the prefetched address. When the memory controller receives a request for the prefetched data, the data can be delivered with less delay relative to a memory controller as is known in the art because the delay incurred by the requesting bus master in waiting for delivery of the requested data is reduced. After receiving a request for the prefetched data, the memory controller can again prefetch the data residing at the next sequential address in memory.

Prefetching data on behalf of a bus master such as an LCD controller can reduce the amount of time the LCD controller waits for the completion of a request to read from memory, thereby improving the efficiency and performance of the computer system.

In one embodiment, the prefetch control data can exist as a register containing a series of bits, each corresponding to a bus master, which the memory controller can read to determine whether memory prefetching is necessary. As a non-limiting example, the prefetch control data for a bus master in a computer system can be a single bit where the value of the bit allows the memory controller to easily determine whether prefetching is necessary once the identity of the requesting bus master is determined. This prefetch control data may also be programmable by the user of the computer system, the operating system or other software to provide for increased flexibility of the memory controller's prefetching abilities.

Other systems, methods, features, and/or advantages will be or may become apparent to one with skill in the art upon examination of the following drawings and detailed description. It is intended that all such additional systems, methods, features and/or advantages be included within this description and be protected by the accompanying claims.

Having summarized various aspects of the present disclosure, reference will now be made in detail to the description as illustrated in the drawings. While the disclosure will be described in connection with these drawings, there is no intent to limit it to the embodiment or embodiments disclosed therein. On the contrary, the intent is to cover all alternatives, modifications, and equivalents included within the spirit and scope of this disclosure as defined by the appended claims. It should be emphasized that many variations and modifications may be made to the above-described embodiments. All such modifications and variations are intended to be included herein within the scope of this disclosure and protected by the claims following this disclosure.

Figure 1:
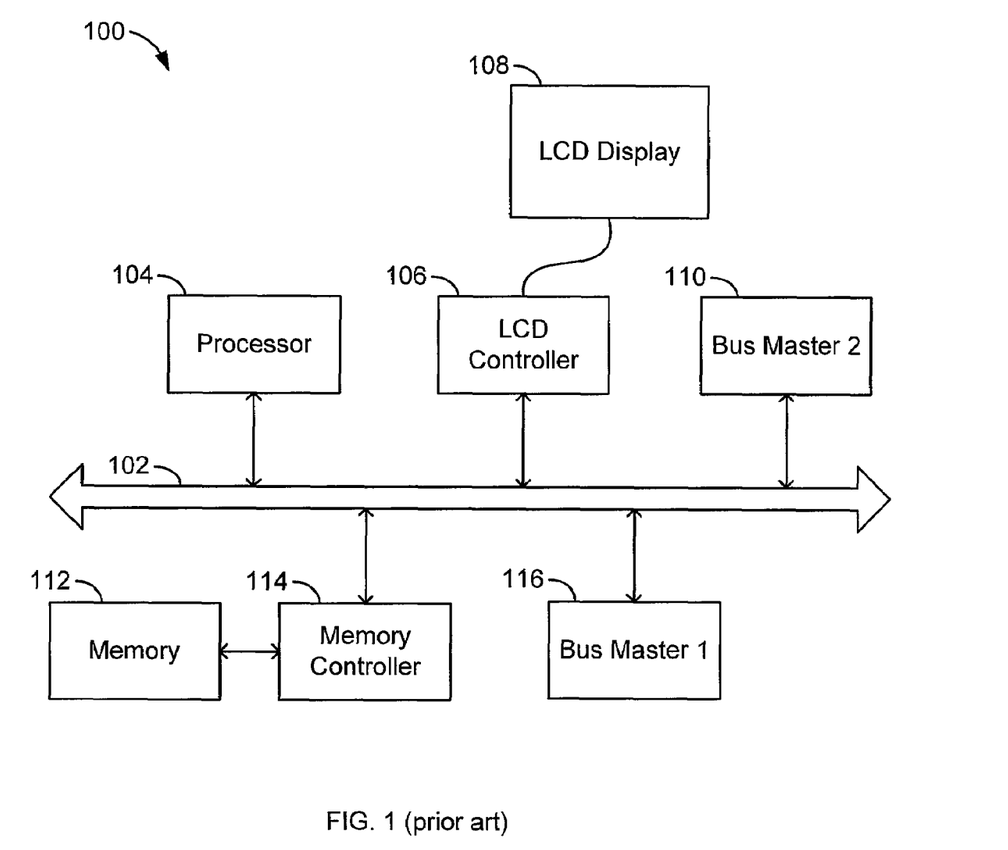
FIG. 1 is functional block diagram of a computer system depicting bus masters and a memory controller coupled to a system bus as well as memory coupled to a memory controller, as is known in the prior art.

FIG. 1 represents a framework known in the art arranging components in a computer system 100 around a system bus 102. In the depicted computer system 100, bus masters are coupled to a system bus 102, which utilize the system bus 102 to communicate with one another as well as with memory via a memory controller 114 coupled to the system bus 102. The system 100 is shown with a processor 104, an LCD controller 106, bus master 1 116 and bus master 2 110, which represent bus masters that may communicate with each other and with the memory controller 114, however, a person of ordinary skill in the art would recognize that other components or bus masters may be coupled to a system bus 102 and incorporated into a computer system 100.

If a bus master requires communication with memory 112 of the computer system 100, the bus master submits a request to the memory controller 114, which decodes and handles the request, which can include retrieving data from memory 112 and making the data available on the system bus 102 or writing data to memory 112. As noted above, a bus master such as an LCD controller 106 can often submit a number of requests to read data from memory consecutively. Each successive request from the LCD controller 106 can often be a request to read data from the next sequential address in memory in relation to the previous request from the LCD controller 106. Such a situation can arise when the LCD controller 106 is attempting to write information to the LCD display 108 because it often does so when updating of drawing the entire LCD display 108 using information stored in sequential blocks in memory 112.

A potential bottleneck in the computer system 100 can occur when the LCD controller 106 is involved in updating the LCD display 108. The memory controller 114 can retrieve a block of data from memory 112 when requested, but memory controllers 114 known in the art often cannot predict the next address in memory 112 that will be requested. A computer system 100 incorporating a memory controller 114 that has the capability to anticipate the next address in memory 112 that will likely be requested by a bus master can improve the efficiency of the system and increase the availability of the system bus 102 and memory 112 for use by other bus masters.

Figure 2:
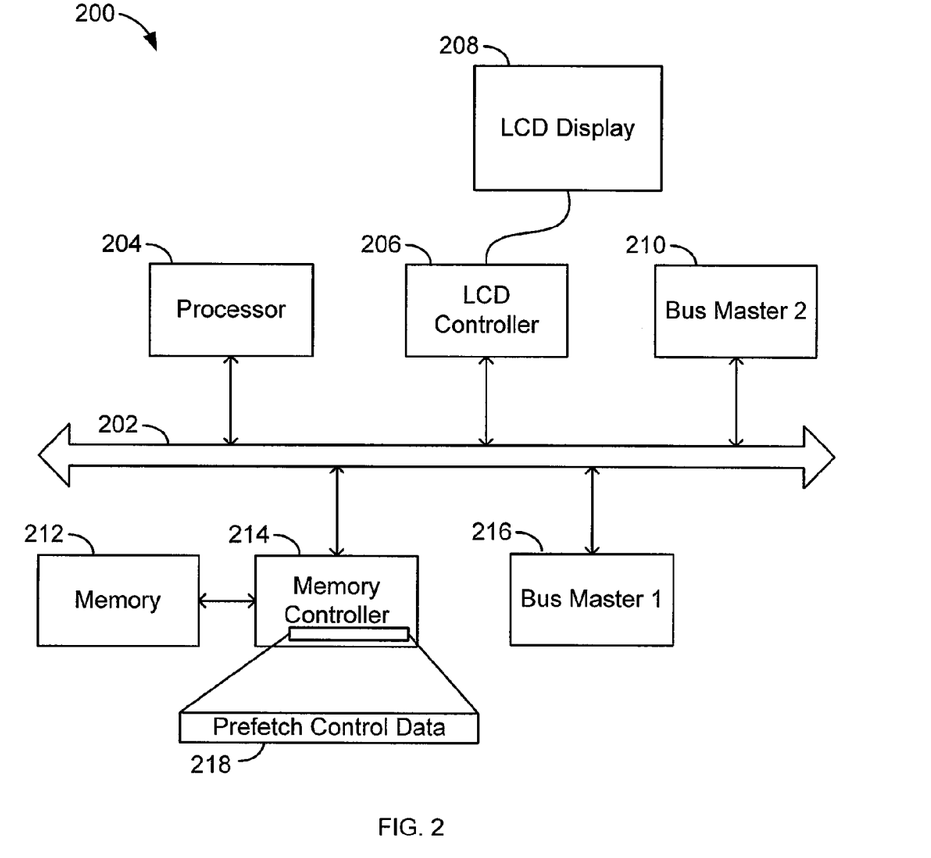
FIG. 2 is a functional block diagram of an embodiment of a memory controller incorporated into a computer system in accordance with the disclosure.

FIG. 2 depicts a functional block diagram of an embodiment according to the disclosure. The computer system 200 includes a processor 204, LCD controller 206 and other bus masters which are coupled to a system bus 202. The computer system 200 also includes a memory controller 214 and memory 212, the memory controller 214 coupled to the system bus 200 as well as memory 212. The bus masters can communicate with each other and with the memory controller 214 via the system bus 202. As mentioned above, the memory controller 214 handles a request from a bus master to read or write data from memory 212.

To improve the efficiency and performance of the computer system 200, the memory controller 214 can prefetch data or retrieve data it anticipates will be requested before actually receiving a request for such data. Upon receiving a request for the prefetched data the memory controller 214 can deliver the data without causing the requesting bus master to incur any further delay related to the memory controller's 214 fetching of data. The memory controller 214 can also repeat the process of prefetching upon receiving a request for the prefetched data, reducing delay for the subsequent request should it be a request from the same bus master for the prefetched data. Prefetching can improve the efficiency and performance of the system by reducing the amount of time a requesting bus master will wait in response to a request to read memory 212 if the memory controller 214, after receiving an initial request from the bus master, can anticipate subsequent read requests of the bus master and have the data ready for delivery.

To improve the efficiency and performance of the computer system 200, the memory controller 214 stores prefetch control data 218, which allows the memory controller 214 to determine whether to prefetch data from memory 212 on behalf of a bus master. The prefetch control data 218 can exist as a register with a series of bits corresponding to each bus master in the computer system 200 or as another structure for storing information known in the art. In the case that prefetch control data 218 exists as a series of bits, where each bit corresponds to whether a bus master within the computer system 200 requires prefetching, the memory controller 214 can check the value of a bit corresponding to a requesting bus master to determine if prefetching is required. The prefetch control data 218 may be programmable by a user, operating system, other software, or hardware. Alternatively, the memory controller 214, processor 204, or another component of the computer system 200 may dynamically generate information regarding whether prefetching is required for bus masters in the computer system 200 and cause the information to be stored within the prefetch control data 218.

The memory controller 214, after receiving a request from a bus master, can access the prefetch control data 218 to determine whether prefetching is required. If the memory controller 214 determines that prefetching of data from memory 212 is required, the memory controller 214 will prefetch data residing at an address in memory 212 that the memory controller 214 can anticipate the data residing at the address will be requested by the bus master in the next or future submitted request. Often, the memory controller 214 will prefetch the data residing at the next sequential address in memory 212. Prefetching can often be required on behalf of a LCD controller 206 because the LCD controller 206 will often request the data residing at the next sequential address in memory 212 because the LCD controller 206 is often updating the contents of or drawing the LCD 208.

The prefetch control data 218 can also contain further information regarding prefetching aside from simply whether or not prefetching is required based on the identity of the requesting bus master. As a non-limiting example, prefetch control data 218 may further contain, for specific bus masters, a range of addresses that a requesting bus master will request data from so that the memory controller 214 can determine whether prefetching is required on a request-by-request basis as opposed to or in addition to making the determination simply based on the identity of the bus master. If prefetch control data 218 contains such a range of addresses and the memory controller 214 receives a request from a bus master that requires prefetching, the memory controller 214 can analyze the address requested by the bus master to determine whether to prefetch on behalf of the requesting bus master. For example, if the memory controller 214 ordinarily prefetches the data residing at the next sequential address in memory 212 on behalf of a requesting bus master and the bus master submits a request at the end of a range of addresses specified in prefetch control data 218, the memory controller 214 can make a determination that prefetching is no longer required or fetch the first address in the range as opposed to the next sequential address.

Figure 3:
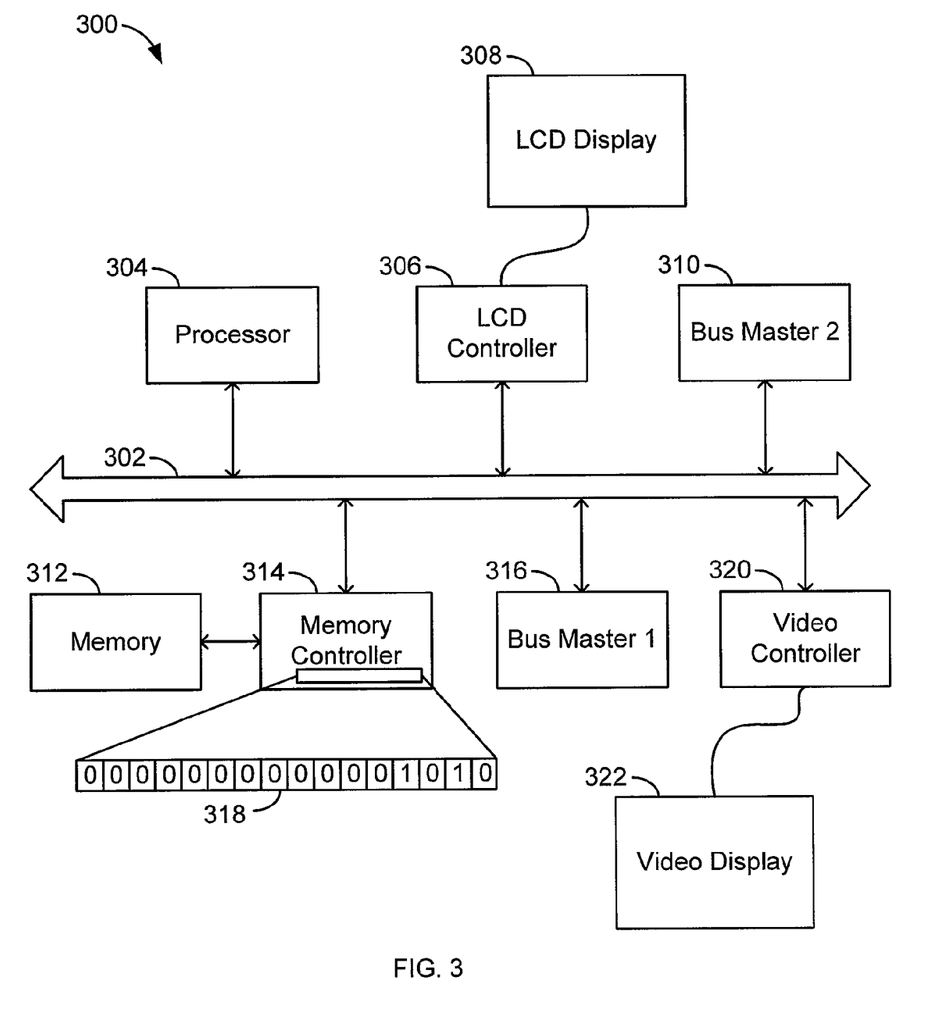
FIG. 3 is a functional block diagram of the embodiment of FIG. 1 depicting an exploded view of prefetch control data.

FIG. 3 depicts the embodiment of FIG. 2 with an exemplary implementation of prefetch control data. The memory controller 314 maintains a register 318 containing a series of bits corresponding to whether prefetching is required on behalf of a requesting bus master. Each bit in the register 318 can correspond to a single bus master of the computer system 300 and can be set to a value of '1' if prefetching is required or a value of '0' if prefetching is not required on behalf of a bus master. A person of ordinary skill in the art would appreciate that other schemes for utilizing and setting values of the register 318 bits can be utilized so that the memory controller 314 determine whether prefetching is required. In the depicted embodiment, LCD Controller 306 and Video Controller 320 are bus masters requiring prefetching. The memory controller 314, upon receiving a request to read data from memory 312 from LCD Controller 306 or Video Controller 320, determines the identity of the requesting bus masters and further determines whether prefetching of data from memory 312 is required for the requesting bus master by accessing prefetch control data register 318 and the bit corresponding to the requesting bus master.

Figure 4:
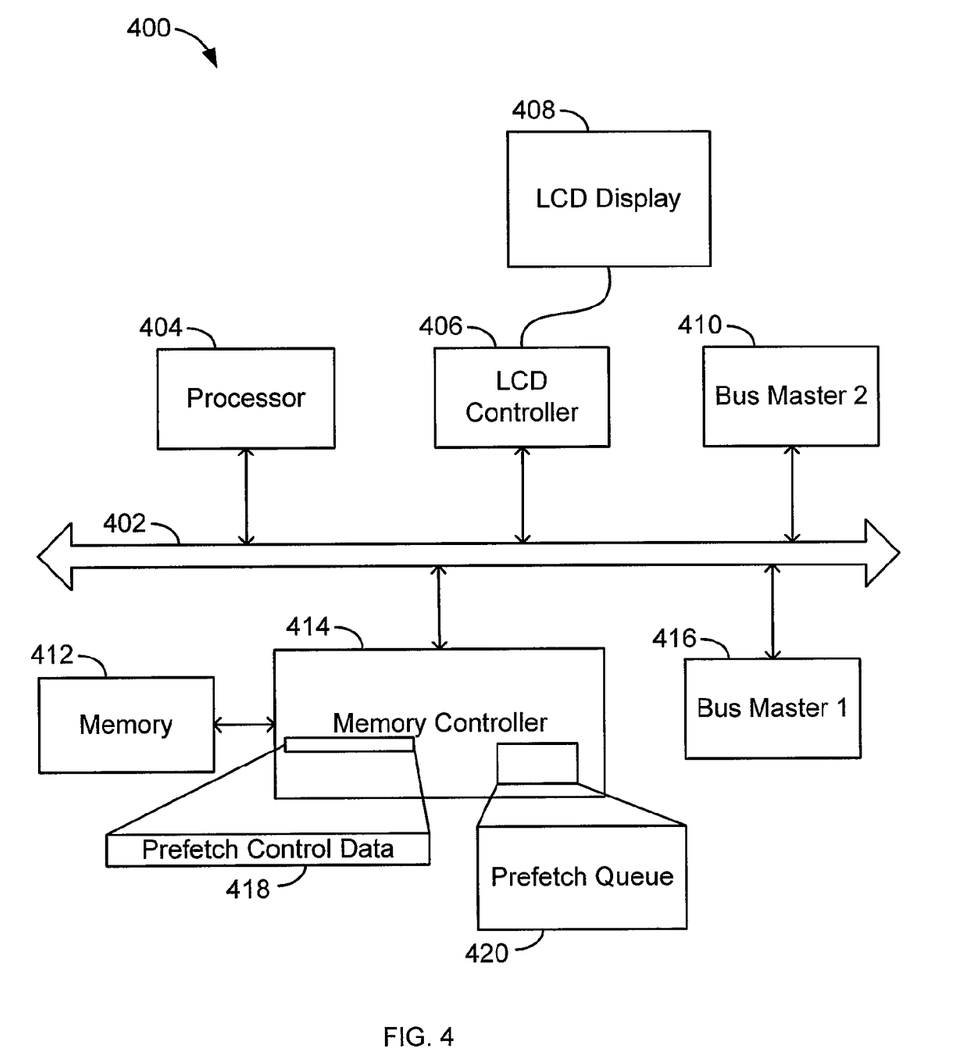
FIG. 4 is a functional block diagram of an embodiment of a memory controller incorporated into a computer system in accordance with the disclosure.

FIG. 4 represents an exemplary embodiment of the disclosure with a Prefetch Queue 420. The embodiment depicted maintains prefetch control data 418 as mentioned above in reference to the embodiment depicted in FIG. 2, which allows the memory controller 414 to determine whether prefetching is required on behalf of a requesting bus master. Additionally, Prefetch Queue 420 enables the memory controller 414 to prefetch and store more than one block of data on behalf of a bus master for rapid delivery in response to subsequent requests to read from memory 412 from the bus master. A larger prefetch queue 420 may be desirable if, for example, despite the memory controller's 414 prefetching of one block of data at a time following a request by a bus master, a bus master is still encountering delays or wait times that lower the performance and efficiency of the computer system 400 that can be attributed to the memory controller 414. Prefetch Queue 420 allows the memory controller 414, after receiving an initial request from a bus master requiring prefetching, to prefetch and store multiple blocks of memory from locations in memory determined by the memory controller 414 while the requesting bus master is performing a task with the most recently delivered data. The memory controller 414 may be able to prefetch more than one block of data from memory and store the blocks in the Prefetch Queue 420 so that the multiple blocks of data may be delivered with minimal wait times.

Figure 5:
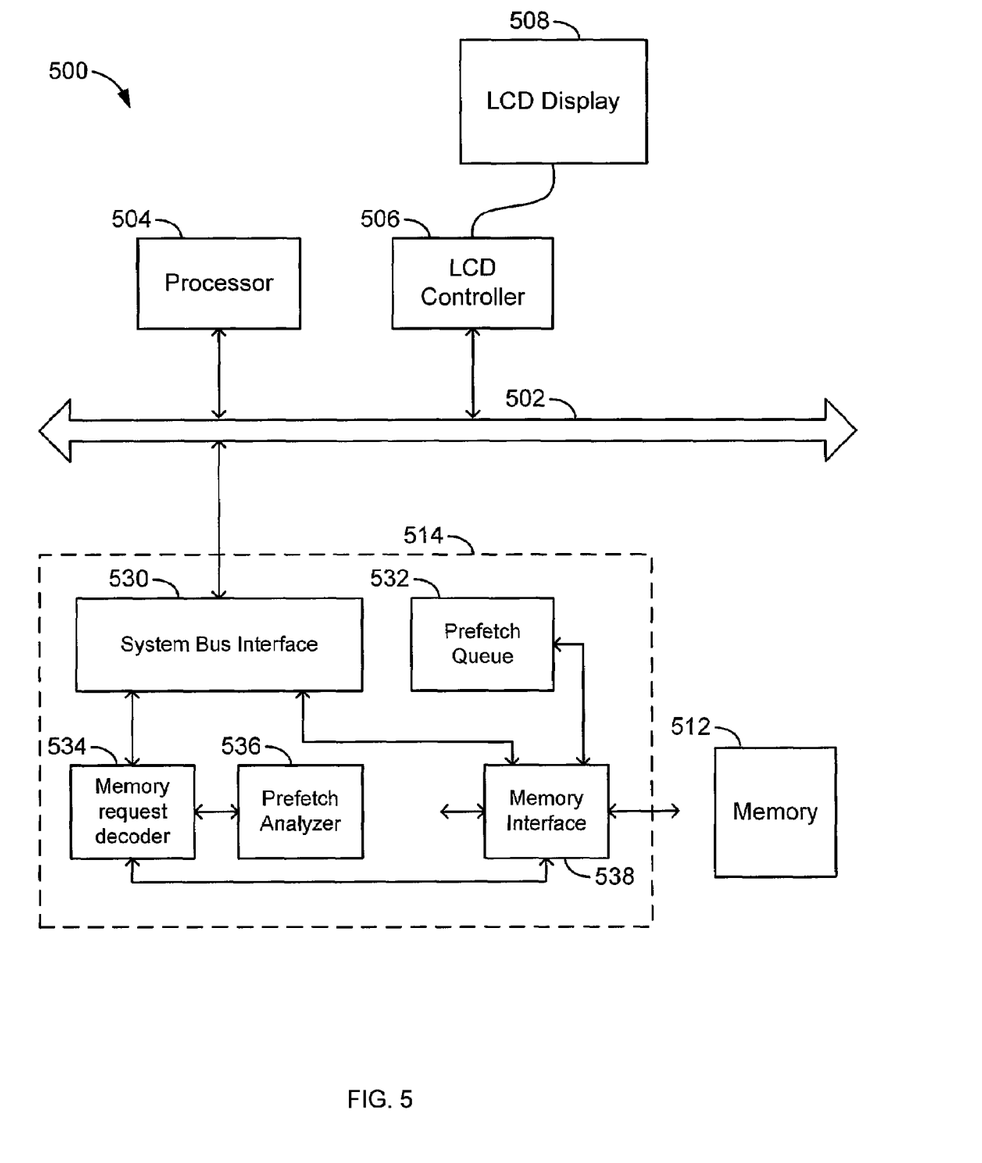
FIG. 5 is a functional block diagram of an embodiment of a memory controller incorporated into a computer system in accordance with the disclosure.

FIG. 5 shows an alternative depiction of an exemplary embodiment according to the disclosure. A memory controller 514 is shown coupled to a system bus 502 as well as memory 512 of the computer system 500. Bus masters (processor 504 and LCD controller 506) are shown coupled to the system bus 502, but the computer system 500 may include other bus masters not depicted, and the depicted bus masters are not required for operation of the embodiment.

As mentioned above, the memory controller 514 handles a request from a bus master to read or write data from memory 512. To improve the efficiency and performance of the computer system 500, the memory controller 514 can prefetch data, or retrieve data it anticipates will be requested before actually receiving a request for such data. Upon receiving a request for the prefetched data the memory controller 514 can deliver the data without causing the requesting bus master to incur any further delay related to the memory controller's 514 fetching of data. The memory controller 514 can also repeat the process of prefetching upon receiving a request for the prefetched data, reducing delay for the subsequent request should it be a request from the same bus master for the prefetched data. Prefetching can improve the efficiency and performance of the system 500 by reducing the amount of time a requesting bus master will wait in response to a request to read memory if the memory controller 514, after receiving an initial request from the bus master, can anticipate subsequent read requests of the bus master and have the data ready for delivery.

The depicted memory controller 514 communicates with the system bus 502 and other components coupled to the system bus via a system bus interface 530. If a bus master submits a request to read data from memory 512 to the memory controller 514, the system bus interface 530 receives the request and the request is decoded by the memory request decoder 534. The memory request decoder 534 determines the identity of the requesting bus master, the type of request submitted, and other properties of a request. If the request is a request to read data from memory 512, the request will be analyzed by the prefetch analyzer 536 to determine whether the prefetching of data from memory 512 is required on behalf of the requesting bus master.

The prefetch analyzer 536 can simply determine whether prefetching is required based on the identity of the requesting bus master. Alternatively, the prefetch analyzer 536 can determine whether prefetching is required based on the address in memory 512 requested and/or the identity of the requesting bus master. The prefetch analyzer 536 can also determine whether prefetching is required based on other properties of the request and requesting bus master. The prefetch analyzer 536 can also determine the location of memory that should be prefetched by the memory interface 538. The above noted request is further handled by a memory interface 538, which interfaces with memory 512 and performs fetching and storing of data in memory 512. If a request initiates from a bus master that requires prefetching, the memory interface 538 can first determine if the requested data resides in the prefetch queue 532 before fetching the data from memory 512. If the requested data does not reside in the prefetch queue 532, the memory interface 512 fetches the requested data from memory 512 and delivers the data via the memory controller bus interface 530, which delivers the requested data to the requesting bus master via the system bus 502.

The prefetch queue 532 can be a register with the capacity to store one block of data from memory 512 or a larger queue capable of storing more than one block from memory 512. As noted above, the prefetch analyzer 536 makes the determination of whether prefetching is required on behalf of the requesting bus master. After making such a determination, the prefetch analyzer 536 can also request that the memory interface 538 prefetch data to be placed in the prefetch queue 532. The prefetch analyzer 536 determines the address in memory 512 to be prefetched and communicates the proper address, and the memory interface 538 fetches the data residing at the address and stores the fetched data in the prefetch queue 532. The prefetch analyzer 536 can determine the address by requesting the data residing at the next sequential address, which is often the case for bus masters such as an LCD controller 506, which can request a range of sequential addresses in memory when drawings or updating the contents of an LCD display 508.

Figure 6:
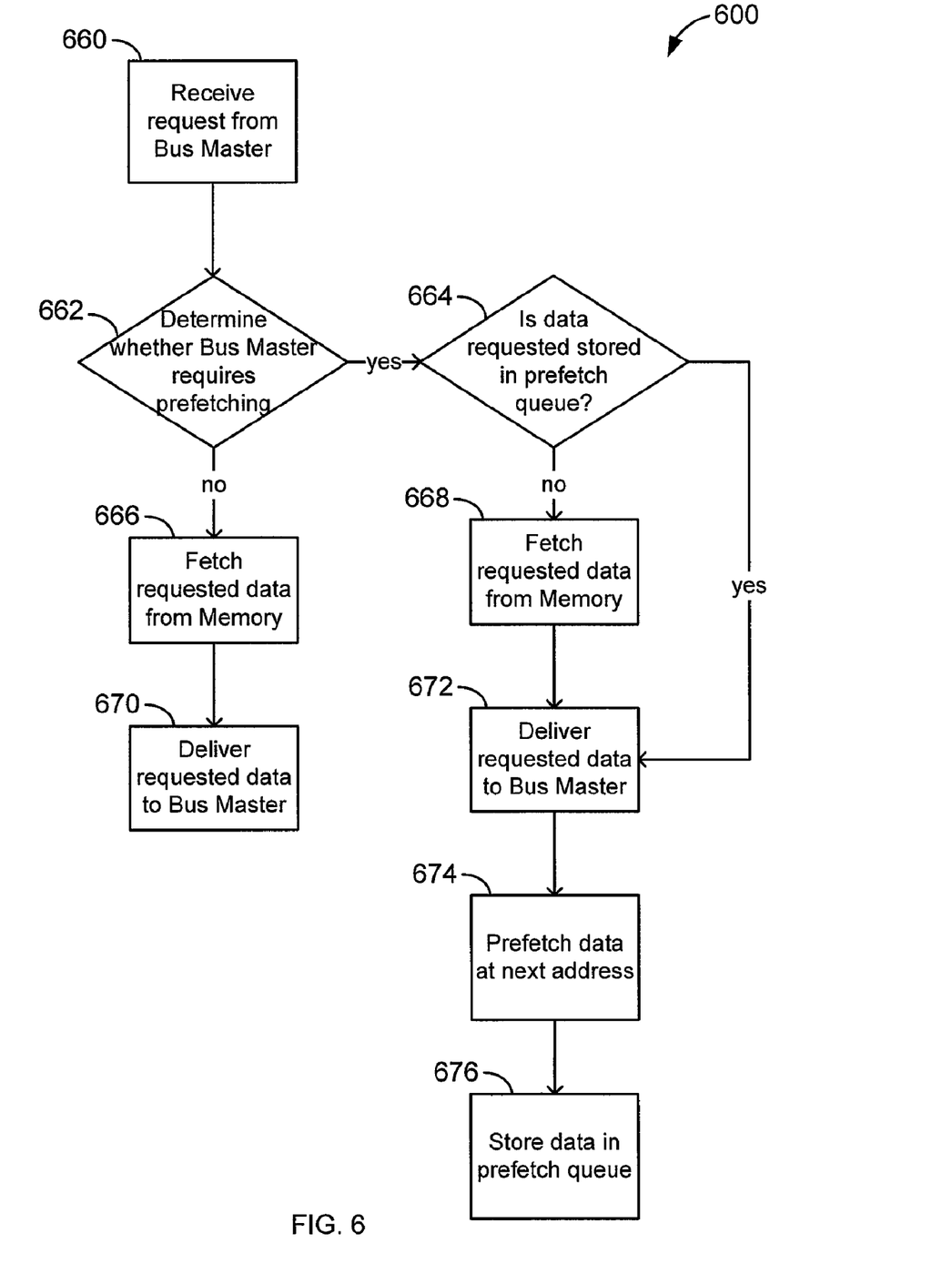
FIG. 6 is a flowchart depicting an embodiment of a method in accordance with the disclosure.

The flow-chart of FIG. 6 depicts an exemplary embodiment of a method according to the disclosure. In step 660, a request to read data from a bus master on a system bus is received. In step 662, it is determined whether data prefetching in accordance with this disclosure is required. It should be appreciated that whether data prefetching is required can be determined based on the identity of the requesting bus master or other characteristics of the received request appreciated by a person of ordinary skill in the art. For example, if a requesting bus master typically requests data from memory in a sequential fashion, then the decision of step 662 can be made based on the identity of the requesting bus master. If prefetching is not required for a requesting bus mater, then an embodiment of the disclosed method can proceed to step 666, where data is fetched from memory and delivered to the requesting bus master in step 670.

However, if prefetching is required or can be used with respect to a requesting bus master, the depicted embodiment can proceed to step 664. In step 664, it is determined whether the requested data resides in a prefetch queue. If the requested data does not reside in a prefetch queue, then the data is requested from memory in step 668 and delivered to the requesting bus master in step 672. If a memory controller or other component implementing the disclosed method has already prefetched data on behalf of a requesting bus master, then in step 672, the data is delivered to the requesting bus master bypassing any latencies that would have been incurred in step 668. In step 674, data is prefetched on behalf of the requesting bus master. Data can be prefetched from a next sequential address in memory or at other an alternative location that the requesting bus master is likely to request in a subsequent request for data from memory. In step 676, the prefetched data is stored in a prefetch queue for delivery to a requesting bus master during a subsequently submitted request for data.

It should be noted that the method depicted in FIG. 6 as well as other embodiments of the present disclosure can be implemented in hardware, software, firmware, or a combination thereof. In one embodiment(s), the method is implemented in software or firmware that is stored in a memory and that is executed by a suitable instruction execution system. If implemented in hardware, as in an alternative embodiment, the method can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A system for retrieving data from memory, comprising:
   a system bus;
   at least one bus master coupled to the system bus; and
   a memory controller coupled to the system bus and memory, the memory controller configured to fetch and store data from memory in response to a request submitted by the at least one bus master,
   wherein the memory controller is configured to prefetch data from memory based on information in a prefetch register relating to the at least one bus master,
   wherein the memory controller is further configured to prefetch data from memory based on whether a block of memory to be prefetched is within a range of addresses, and
   wherein the memory controller is configured to determine whether to prefetch data from memory on behalf of the at least one bus master and the memory controller is further configured to prefetch and store data for delivery in response to a subsequent request for data from the at least one bus master.

2. The system of claim 1, wherein the prefetch register stores one bit corresponding to each at least one bus master from which the memory controller determines whether to prefetch data from memory on behalf of the at least one bus master.

3. The system of claim 1, wherein the memory controller is configured to prefetch the data located at next sequential address in memory relative to the data located at the address in memory fetched in response to a request submitted by the at least one bus master.

4. The system of claim 1, wherein the memory controller is configured to store information regarding the range of addresses in memory from which the at least one bus master for which prefetching is required will request data.

5. The system of claim 4, wherein the information comprises a range of addresses for each of the at least one bus master.

6. The system of claim 1, wherein the memory controller is configured to store at least one block of prefetched data from memory in a prefetch queue.

7. The system of claim 1, wherein the memory controller is configured to determine an address in memory to prefetch based on information stored in the memory controller and the identity of the at least one bus master submitting a request.

8. The system of claim 1, wherein the memory controller is configured to commence prefetching of data before receiving a subsequent request from the at least one bus master.

9. The system of claim 1, wherein the at least one bus master includes one liquid crystal display (LCD) controller, wherein the memory controller prefetches data from memory on behalf of the LCD controller.

10. The system of claim 1, wherein the memory controller further comprises:
   a memory request decoder configured to decode a request to read from or write to memory submitted by a bus master and to determine the identity of the bus master submitting the request,
   a prefetch analyzer configured to determine whether to prefetch data from memory on behalf of the bus master submitting the request, the prefetch analyzer further configured to determine the location in memory to prefetch, and a prefetch queue configured to store at least one block of data prefetched from memory.

11. The system of claim 1, wherein the prefetched data comprises multiple blocks of memory from locations in memory determined by the memory controller.

12. A method for retrieving data from memory in a computer system, comprising the steps of:
   receiving a request from a bus master to fetch data from memory,
   determining whether to prefetch data from memory on behalf of the bus master,
   prefetching data in anticipation of a subsequent request by the bus master in response to the determining step, and
   storing at least one block of prefetched data for rapid delivery upon the subsequent request by the bus master;
   identifying the identity of the requesting bus master; and
   referencing prefetch information corresponding to the identity of the requesting bus master, wherein the prefetch information includes information regarding whether to prefetch on behalf of the bus master.

13. The method of claim 12, wherein the at least one block of prefetched data is stored in a prefetch queue.

14. The method of claim 12, wherein the prefetched data is fetched from the next sequential address in memory relative to an address in the request.

15. The method of claim 12, further comprising the step of:
   determining an address of the prefetch data according to the request.

16. The method of claim 15, further comprising the steps of:
   storing information regarding a range of addresses in memory from which a requesting bus master for which prefetching is required will request data, wherein data is not prefetched if the address of the prefetch data is outside of the range of addresses.

17. The method of claim 12, further comprising the step of:
   receiving the subsequent request after at least one step chosen from: the determining, the prefetching, and the storing.

18. A memory controller for retrieving data from memory, comprising:
   a memory request decoder configured to decode a request to read from or write to memory submitted by a bus master and to determine the identity of the bus master submitting the request,
   a prefetch analyzer configured to determine whether to prefetch data from memory on behalf of the bus master submitting the request, the prefetch analyzer further configured to determine the location in memory to prefetch, and a prefetch queue configured to store at least one block of data prefetched from memory.

19. The memory controller of claim 18, wherein the prefetch analyzer comprises:

a register containing a plurality of bits, and a bit corresponds to each bus master in communication with the memory controller, wherein the value of the bit enables the memory controller to determine whether a bus master requires prefetching.

20. The memory controller of claim 18, wherein the prefetch analyzer determines to prefetch the next sequential block of data from memory if the prefetch analyzer determines prefetching is required on behalf of a bus master.

21. The memory controller of claim 18, wherein the memory controller commences prefetching of data from memory before receiving a subsequent request from a bus master.

* * * * *